United States Patent [19]
Kim

[11] Patent Number: 5,452,132
[45] Date of Patent: Sep. 19, 1995

[54] PROJECTION LENS SYSTEM FOR REAR TYPE PROJECTION TELEVISION

[75] Inventor: Dong-ha Kim, Suwon, Rep. of Korea

[73] Assignee: Samsung Electronics Co., Ltd., Kyonggi, Rep. of Korea

[21] Appl. No.: 141,939

[22] Filed: Oct. 28, 1993

[30] Foreign Application Priority Data

Oct. 28, 1992 [KR] Rep. of Korea .................... 92-19859

[51] Int. Cl.$^6$ .............................................. G02B 3/02
[52] U.S. Cl. .................................... 359/649; 359/714
[58] Field of Search ............................ 359/649–650, 359/708, 713, 714, 754, 755–757, 759, 763, 764, 767

[56] References Cited

U.S. PATENT DOCUMENTS

| | | | |
|---|---|---|---|
| 4,815,831 | 3/1989 | Betensky | 359/649 |
| 4,950,062 | 8/1990 | Kimura et al. | 359/650 |
| 4,963,007 | 10/1990 | Moskovich | 359/649 |

*Primary Examiner*—Loha Ben
*Assistant Examiner*—James Phan
*Attorney, Agent, or Firm*—Sughrue, Mion, Zinn, Macpeak & Seas

[57] ABSTRACT

A projection lens system for use in a rear type projection television. The system includes a first lens of which at least one surface is aspherical, the center portion of which has little optical power, and the peripheral portion of which has a weak positive optical power. A second lens of the system has a strong positive optical power and a bi-convex shape, wherein at least one of its surfaces is aspherical. A third lens in the system has a strong negative optical power and a bi-concave shape, and has at least one surface that is aspherical. A fourth lens has a strong positive optical power and a bi-convex shape, and at least one aspherical surface. A fifth lens has a weak negative optical power and a meniscus shape, wherein at least one surface is aspherical. The projection lens system reduces the number of lenses required, as compared with the prior art, provides a brighter picture and a greater field angle, and facilitates the correction of chromatic aberrations.

9 Claims, 2 Drawing Sheets

PROJECTION LENS SYSTEM FOR REAR TYPE PROJECTION TELEVISION

The following disclosure is based on Korean Patent Application No. 92-19859, filed on Oct. 28, 1992, which is incorporated into this application by reference.

BACKGROUND OF THE INVENTION

The present invention relates to a projection lens system for use in a rear type projection television, and more particularly to a projection lens system capable of reducing the number of lenses in the system and correcting chromatic aberrations.

Generally, a projection television enlarges and projects lights of red (R), green (G) and blue (B) emitted from a cathode ray tube (CRT) onto a CRT screen through the use of a plurality of projection lenses. Generally, the projection methods are classified into the following: a front type projection method in which the images are projected onto the front surface of a CRT screen such that the images reflected from the CRT screen can be viewed by a user, and a rear type projection method in which the images are projected onto the rear surface of the CRT screen such that the images transmitted through the CRT screen can be viewed by the user.

In rear type projection televisions, which use the rear type projection method, since the lights entering the screen are not reflected from the screen but transmitted through it, definitive images can be provided even in the bright peripheral areas of the screen. Accordingly, rear type projection televisions are generally preferred by users. However, such projection televisions require wider field-angles in order to enlarge projection magnification. At the same time, it is desirable to reduce the depth of the projection system as much as possible. Also, the rear-type projection televisions require smaller brightness values for the lens system (F-numbers, which are equal to an aperture distance divided by an effective focal distance, can be used to quantify brightness values) in order to form a bright image on the screen. Furthermore, light quantity differences between the center of the screen and the periphery thereof should be as little as possible. Finally, chromatic aberrations generated due to differences between the R, G and B lights need to be corrected.

To meet the above requirements, several projection lens systems have been developed. However, in conventional projection lens systems, a lens which is located in the center of the lens system provides most of the optical power in the lens system. Here, to represent the magnitude of the optical power, when the light is converged into a focal point, the degree of convergence is expressed as a positive value, while when the light is diverged from the light source, the degree of divergence is expressed as a negative value. When a single lens provides most of the entire optical power, the image can be made relatively bright. However, since a peripheral light quantity ratio, (that is, a light quantity ratio of a peripheral portion with respect to the screen center portion) is thereby rendered low (for example less than 21%), the periphery of the screen is relatively dark. Also, since correction of the chromatic aberrations is often not sufficient, it is difficult to form an excellent image. Further, since the glass lenses utilized are designed to have spherical surfaces at least six lenses have been needed to correct for aberration.

SUMMARY OF THE INVENTION

Therefore, to solve the above problems, it is an object of the present invention to provide a projection lens system for use in a rear type projection television in which the number of the lenses required for the projection lens system is reduced, a high peripheral light quantity ratio is maintained while forming a brighter image, a wider field-angle is achieved, and chromatic aberration is more efficiently corrected.

To accomplish the above object of the present invention, there is provided a projection lens system having a plurality of lenses which are sequentially arranged along an optical axis perpendicular to a CRT screen for use in a rear type projection television. The projection lens system comprises: a first lens of which at least one surface is aspherical, the center portion of which has little optical power, and the peripheral portion of which has a weak positive optical power; a second lens having a strong positive optical power and a bi-convex shape, of which at least one surface is aspherical; a third lens having a strong negative optical power and a bi-concave shape, of which at least one surface is aspherical; a fourth lens having a strong positive optical power and a bi-convex shape, of which at least one surface is aspherical; and a fifth lens having a weak negative optical power and a meniscus shape, of which at least one surface is aspherical.

DETAILED DESCRIPTION OF THE PREFERRED EMBODIMENTS

Preferred embodiments of the present invention will be described below in more detail with reference to the accompanying drawings.

Figure 1:
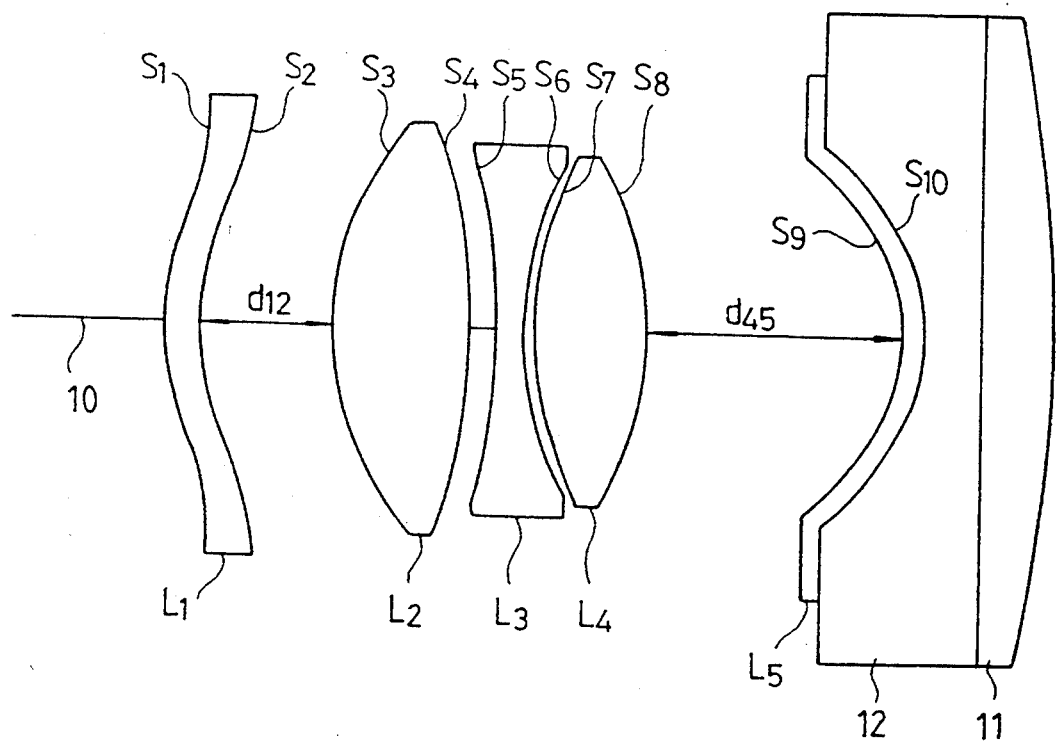
FIG. 1 is a lens arrangement diagram of one embodiment of a projection lens system according to the present invention.
Figure 2:
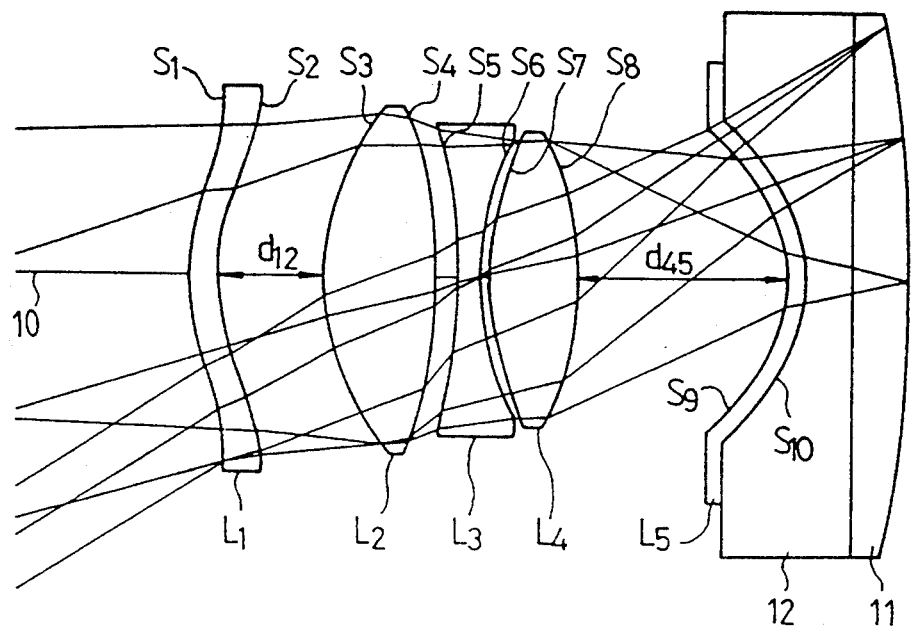
FIG. 2 shows an example of light paths for the projection lens system of FIG. 1.

A projection lens system of FIG. 1 comprises first lens through fifth lenses $L_1$, $L_2$, $L_3$, $L_4$ and $L_5$ which are arranged along an optical axis 10 from a reflective mirror (not shown) to a CRT screen.

Preferred specifications for the projection lens system shown in FIG. 1 are represented in Tables 1A to 1C, and are further described hereinafter. Such a projection lens system comprises a cooling portion 12 between a CRT front glass 11 and the fifth lens $L_5$. The cooling portion 12 is provided to prevent the lens from changing shape due to the CRT temperature rise and to prevent reductions in image formation capability. The above cooling portion 12 is filled with a coolant having a refractive index which is nearly the same as that of fifth lens $L_5$.

First lens $L_1$ is designed such that at least one surface is an aspherical surface, the center portion centered at the optical axis has little optical power and the peripheral portion has a weak positive optical power. First lens $L_1$ corrects spherical aberration, coma aberration and oblique astigmatism.

Second lens $L_2$ is a glass lens having a strong positive optical power and a low dispersion value (called an Abbe-number). It is bi-convex in shape and has at least one surface that is aspherical.

Third lens $L_3$ is a glass lens having a strong negative optical power and a high dispersion value. It has a bi-concave shape and has at least one surface that is aspherical.

Second and third lenses $L_2$ and $L_3$ chiefly play a role of correcting chromatic aberration, and of partly correcting coma aberration and oblique astigmatism. Also, refraction and dispersion between second lens $L_2$ and third lens $L_3$ have the following relationships.

$$|N_2-N_3| > 0.13 \ldots \quad (1)$$

$$|V_2-V_3| > 25.0 \ldots \quad (2)$$

Here, $N_2$ is a refractive index of the second lens,
$N_3$ is a refractive index of the third lens,
$V_2$ is a dispersion value of the second lens, and
$V_3$ is a dispersion value of the third lens.

As can be readily calculated from the values for N and V given in Table 1A for a specific lens system embodiment, that system of lenses meets both of the above requirements.

Fourth lens $L_4$ is a glass lens having a strong positive optical power. It is bi-convex in shape and has at least one surface that is aspherical. The fourth lens plays the most prominent role in delivering the optical power of the lens system. Also, the fourth lens has a low dispersion value, which is represented in the following formula (3), in order to minimize variation of the Petzval aberration sum according to red, green and blue light wavelengths of the respective CRTs.

$$V_4 > 50.0 \ldots \quad (3)$$

Here, $V_4$ is a dispersion value (Abbe-number) of the fourth lens. Again, this requirement is met for the specific lens system embodiment profiled in Table 1A.

Fifth lens $L_5$ is a plastic lens having a weak negative optical power and a low refractive index, in which both surfaces have aspherical meniscus forms. Also, fifth lens. $L_5$ is closely attached in front of the cooling portion 12, the coolant of which has nearly the same refractive index as that of fifth lens $L_5$. The fifth lens $L_5$ and the cooling portion 12 are integrally formed to have a strong negative optical power, thereby correcting curvature of field and distortion aberration.

In such a projection system, the group optical power of the second lens to fourth lens $L_2$, $L_3$ and $L_4$ and the optical power of the third lens $L_3$ meet the following conditions (4) and (5).

$$1.0 < K_p/K_0 < 1.3 \ldots \quad (4)$$

$$0.9 < |K_3/K_0| < 1.4 \ldots \quad (5)$$

Here, $K_O$ represents an optical power of the entire lens system,
$K_p$ represents a group optical power of the second through fourth lenses, and
$K_3$ represents an optical power of the third lens.

The data relating to the specifications of a specific projection lens system comprising first through fifth lenses $L_1$–$L_5$ is represented in Tables 1A to 1C attached hereinafter.

In Table 1A, the term "thickness" represents a distance between the listed refractive surface and the next refractive surface encountered along the optical axis (where the "thickness" listed for S10 of L5 is the distance to the rear surface of the CRT front glass), the term "radius" represents a radius of curvature of a front surface or a rear surface of each lens, the term "surface" represents a front or rear surface of each lens, whereby the surfaces of the first lens through the fifth lens are represented as $S_1, S_2, \ldots, S_{10}$, and reference symbols "$N_d$" and "$V_d$" represent refractive index and Abbe-number, respectively.

Further, a surface sag value Z necessary for designing an aspherical lens is determined by the following equation (6).

$$Z = \frac{S^2/R}{1 + \sqrt{1 - (K+1)S^2/R^2}} + AS^4 + BS^6 + CS^8 + DS^{10} + ES^{12} + FS^{14} + GS^{16} + HS^{18} + JS^{20} \quad (6)$$

In equation (6), the reference symbol "K" is a conic constant of each aspherical surface, the reference symbol "R" is a radius of each surface, the reference symbol "S" is a semi-aperture distance which is a random radius distance location from the optical axis, and reference symbols "A" through "J" are aspherical coefficients. Radius R of each surface is represented in Table 1A, while the conic constant K and the aspherical coefficients A–J are represented in Table 1B.

Table 1C represents the capabilities of a projection lens system having the parameters given in Tables 1A and 1B. As seen from Table 1C, the projection lens system having the above-described specifications provides an excellent picture brightness and field-angle. Also, since all the lenses of the system are aspherical, correction of non-axis aberrations is relatively easy. Accordingly, the projection lens system can maintain a projection angle of more than 70 degrees and a periphery light quantity ratio more than 29%. Moreover, since the projection distance of the projection lens system is relatively short, the overall depth of the system can be made smaller. In addition, modulation transfer function (MTF) values of more than 50% and more than 85% can be obtained at 6LP/mm and 2LP/mm of a spatial frequency, respectively (where LP signifies "line-pair"). Accordingly, the present invention can be applied to a high definition television having a horizontal resolution of more than 1,000 lines.

The fluorescent surface of the CRT does not generally emit light of an exact monochrome wavelength. For example, the wavelength of the green light which is emitted from the green fluorescent material extends to wavelength regions of the red light and the blue light. Thus, to obtain a better image, corrections are made corresponding to variations in the focal point according to differences in the wavelengths of the red, green and blue lights. Accordingly, in the embodiment of FIG. 1, the second lens $L_2$ having a strong positive optical power and a low Abbe-number and the third lens $L_3$ having a strong negative optical power and a high Abbe-number are provided, thereby correcting high-degree aberration including chromatic aberration of the light having a wide-scope wavelength.

Figure 3:
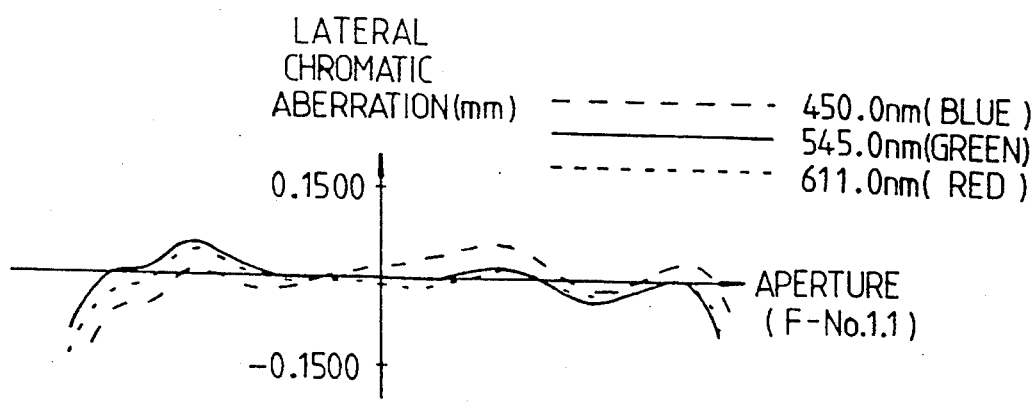
FIG. 3 is a graphical diagram which represents correction of chromatic aberration by the projection lens system of the present invention.

FIG. 3 is a graph illustrating the correction of chromatic aberration by the projection lens system of FIG. 1. In FIG. 3, when an aperture value is determined so that the F-number is 1.1, and red, green and blue lights having wavelengths of 611.0 nm, 545.0 nm and 450.0 nm, respectively, are projected in a projection lens system having a field-angle of 20.0 degrees, it can be seen that aberration is corrected exceedingly well, such that lateral chromatic aberration does not exceed $-0.1500$ mm and $+0.1500$ mm.

In the embodiment of FIG. 1, a distance $d_{45}$ between fourth lens $L_4$ and fifth lens $L_5$ is varied in order to adjust the focal point with respect to variations in projection distance. Also, to correct non-axis aberrations due to variations in the distance between the fourth an fifth lenses, a distance $d_{12}$ between the first lens $L_1$ and the second lens $L_2$ is varied.

In the projection lens system, the inner temperature of the lens system rises about 35° C. to 40° C. due to the relatively high temperature which is emitted from the CRT. Such an inner temperature rise of the lenses severely affects the focal points of the lenses, thereby lowering the image formation capability. To prevent reduction in the image formation capability due to such heat, in the embodiment of FIG. 1, the second through fourth lenses $L_2$, $L_3$ and $L_4$ having the strong optical powers are made of glass. On the other hand, the first and fifth lenses $L_1$ and $L_5$ are made of plastic materials to facilitate mass-production and reduce the cost of production.

Figure 4:
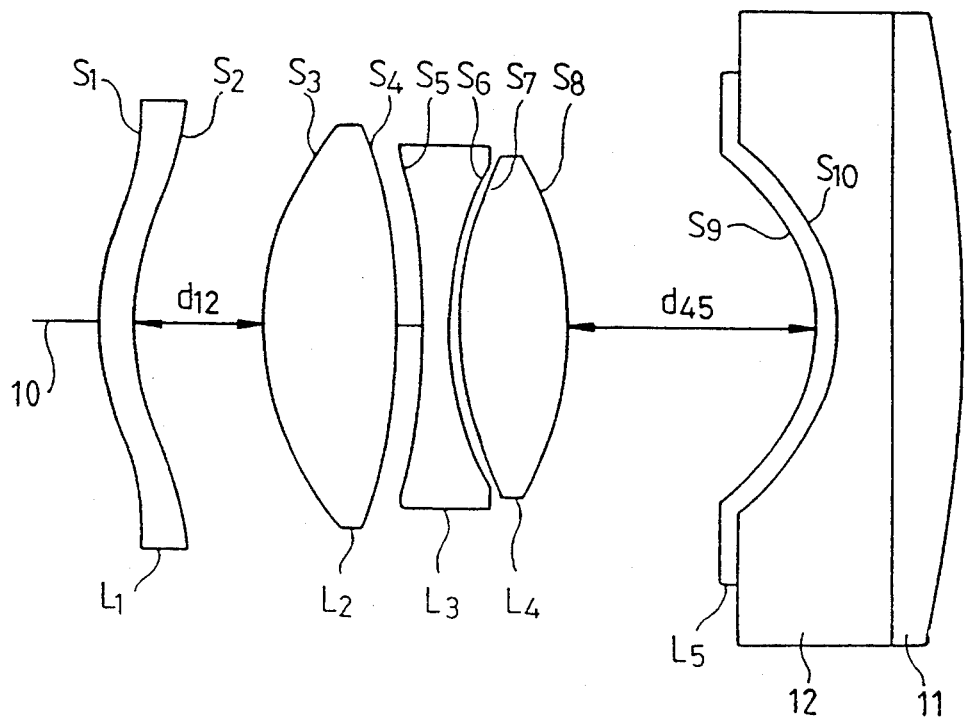
FIG. 4 is a lens arrangement diagram of another embodiment of a projection lens system according to the present invention.

FIG. 4 is a lens arrangement diagram of another embodiment of a projection lens system according to the present invention. The projection lens system of FIG. 4 comprises five lenses $L_1$–$L_5$, similarly to the projection lens system of FIG. 1. The specifications of the projection lens system of FIG. 4 are represented in Tables 2A and 2B, and the capability thereof is represented in Table 2C (attached hereinafter). Since the principle of the image formation for the projection lens system of FIG. 4 is the same as that of the projection lens system of FIG. 1, description thereof is omitted.

As described above, the projection lens system used for the rear type projection television according to the present invention produces a bright picture having a brightness value less than 1.1 (F-number). At the same time, the projection lens system has a high peripheral light quantity ratio of more than 29% and a wide angle of more than 70 degrees. Also, the projection lens system of the present invention has lenses, each of which has at least one surface that is aspherical, to correct for chromatic aberrations due to various different wavelengths of light emitted from the CRT fluorescent material. The system further allows the total number of lenses of the system to be reduced.

TABLE 1A

| LENS | SURFACE | RADIUS | THICKNESS | $N_d$ | $V_d$ |
|---|---|---|---|---|---|
| L1 | S1 | 61.594 | 6.0170 | 1.492 | 57.1 |
| L1 | S2 | 60.495 | 23.6477 | | |
| L2 | S3 | 62.462 | 25.5400 | 1.517 | 64.2 |
| L2 | S4 | −140.833 | 4.2986 | | |
| L3 | S5 | −196.949 | 5.0000 | 1.722 | 29.2 |
| L3 | S6 | 70.203 | 1.3936 | | |
| L4 | S7 | 65.339 | 18.7200 | 1.639 | 55.5 |
| L4 | S8 | −94.176 | 46.5736 | | |
| L5 | S9 | −45.257 | 4.1000 | 1.492 | 57.1 |
| L5 | S10 | −47.100 | 10.0940 | | |

TABLE 1B

| ASPHERIC | K<br>E | A<br>F | B<br>G | C<br>H | D<br>J |
|---|---|---|---|---|---|
| S1 | −7.524222<br>3.76524E-21 | 2.02799E-06<br>6.78344E-25 | −2.85342E-09<br>−2.91819E-28 | 9.39920E-13<br>−1.65835E-32 | −1.05716E-16<br>−3.45738E-35 |
| S2 | −0.786503<br>−3.37628E-21 | −8.57887E-07<br>−1.42865E-24 | −1.28715E-09<br>−4.30969E-29 | 4.87108E-13<br>5.68213E-31 | 4.42591E-18<br>−1.19891E-34 |
| S3 | −0.658142<br>−6.07140E-22 | 8.49250E-08<br>−2.10446E-24 | 1.38358E-10<br>5.60820E-28 | 1.82126E-15<br>4.69269E-31 | −3.84915E-17<br>5.82197E-34 |
| S4 | −0.093021<br>1.24225E-21 | −1.29114E-07<br>5.67155E-25 | −4.99466E-11<br>1.60732E-28 | −4.90575E-15<br>3.52458E-31 | 9.92677E-18<br>−2.27794E-35 |
| S5 | 10.238331<br>8.89368E-20 | −2.81160E-07<br>−4.33647E-23 | −1.53968E-10<br>−1.37988E-28 | 4.47461E-14<br>3.18175E-31 | 3.35704E-17<br>−2.47199E-33 |
| S6 | −11.092525<br>−7.37706E-20 | 8.22777E-07<br>9.56694E-23 | 3.00587E-10<br>4.23034E-26 | 6.31957E-14<br>2.53309E-30 | −1.98053E-17<br>−2.33626E-32 |
| S7 | −9.985179<br>−6.14364E-20 | 5.60533E-07<br>1.11382E-23 | 8.74920E-11<br>2.07916E-27 | 5.49590E-15<br>−3.77113E-30 | 1.45511E-17<br>2.43933E-33 |
| S8 | −0.167637<br>8.26265E-20 | −1.28042E-07<br>−7.25999E-23 | 1.55867E-10<br>−2.07671E-26 | −1.02839E-13<br>4.45427E-31 | −1.39444E-17<br>−5.25137E-34 |
| S9 | −0.390000 | | | | |
| S10 | −0.590000 | | | | |

TABLE 1C

| | |
|---|---|
| EFFECTIVE FOCUS LENGTH = | 87.3638 |
| F - NUMBER = | 1.1000 |
| SEMI - FIELD ANGLE = | 35.1173 |

TABLE 2A

| LENS | SURFACE | RADIUS | THICKNESS | $N_d$ | $V_d$ |
|---|---|---|---|---|---|
| L1 | S1 | 62.649 | 6.2733 | 1.492 | 57.1 |
| L1 | S2 | 62.757 | 25.5832 | | |
| L2 | S3 | 69.517 | 23.2048 | 1.589 | 61.3 |
| L2 | S4 | −168.687 | 3.4086 | | |
| L3 | S5 | −186.096 | 5.5000 | 1.722 | 29.2 |
| L3 | S6 | 84.438 | 2.1929 | | |
| L4 | S7 | 77.691 | 19.7612 | 1.639 | 55.5 |
| L4 | S8 | −91.920 | 46.8604 | | |
| L5 | S9 | −44.257 | 4.1368 | 1.492 | 57.1 |
| L5 | S10 | −45.935 | 8.8365 | | |

TABLE 2B

| ASPHERIC | K<br>E | A<br>F | B<br>G | C<br>H | D<br>J |
|---|---|---|---|---|---|
| S1 | −7.686839<br>4.27249E-21 | 2.01735E-06<br>7.95821E-25 | −2.86241E-09<br>−3.80606E-28 | 9.37862E-13<br>1.33889E-32 | −1.05142E-16<br>−5.74167E-36 |
| S2 | −0.787194 | −8.60441E-07 | −1.28347E-09 | 4.84851E-13 | 1.08827E-18 |

TABLE 2B-continued

| ASPHERIC | K / E | A / F | B / G | C / H | D / J |
|---|---|---|---|---|---|
|  | −5.26979E-21 | −1.88949E-24 | 1.81954E-29 | 9.08326E-31 | 3.16534E-35 |
| S3 | −0.833697 | −1.26013E-07 | 6.05290E-10 | −2.75671E-13 | −7.79131E-17 |
|  | 2.97542E-20 | 1.63383E-23 | 4.14328E-27 | −9.19002E-31 | −1.68818E-33 |
| S4 | 1.686400 | −4.19796E-07 | 3.65537E-10 | −3.20485E-13 | 4.59626E-18 |
|  | 4.77953E-20 | 1.87205E-23 | −1.87262E-27 | −4.30929E-30 | −5.84924E-34 |
| S5 | 10.755186 | −2.96247E-07 | −3.06275E-11 | 3.72121E-14 | 3.08526E-17 |
|  | 8.84039E-20 | −4.61502E-23 | 3.05043E-28 | 7.23419E-31 | −2.64989E-33 |
| S6 | −11.496110 | 8.10129E-07 | 3.02094E-10 | 6.64596E-14 | −1.85409E-17 |
|  | −1.50415E-19 | 1.37650E-22 | 3.98938E-26 | −2.96067E-31 | −2.75205E-32 |
| S7 | −10.392329 | 5.42234E-07 | 7.88177E-11 | 1.85804E-15 | 1.38971E-17 |
|  | −1.79738E-19 | 9.63029E-23 | 2.38885E-27 | −3.54632E-30 | 1.34452E-33 |
| S8 | −0.032941 | −1.50300E-07 | 1.34846E-10 | −1.16231E-13 | −2.17359E-17 |
|  | 4.15570E-20 | −4.29680E-23 | −1.86933E-26 | 4.12330E-30 | 3.93701E-33 |
| S9 | −0.390000 |  |  |  |  |
| S10 | −0.590000 |  |  |  |  |

TABLE 2C

| EFFECTIVE FOCUS LENGTH = | 85.2421 |
|---|---|
| F - NUMBER = | 1.0906 |
| SEMI - FIELD ANGLE = | 35.9962 |

What is claimed is:

1. A projection lens system, for use in a rear type projection television, including a plurality of lenses which are sequentially arranged along an optical axis perpendicular to a CRT screen, said projection lens system comprising:
   a first lens having at least one surface that is aspherical, a center portion that has little optical power, and a peripheral portion that has weak positive optical power;
   a second lens having a strong positive optical power and a bi-convex shape, of which at least one surface is aspherical;
   a third lens having a strong negative optical power and a bi-concave shape, of which at least one surface is aspherical;
   a fourth lens having a strong positive optical power and a bi-convex shape, of which at least one surface is aspherical; and
   a fifth lens having a weak negative optical power and a meniscus shape, of which at least one surface is aspherical.

2. The projection lens system according to claim 1, wherein the optical axis passes through the respective centers of said first through fifth lenses.

3. The projection lens system according to claim 1, wherein said strong positive optical power of said fourth lens provides most of the entire optical power for the projection lens system.

4. The projection lens system according to claim 1, wherein a ratio of a group optical power for said second through said fourth lenses with respect to an optical power of the entire projection lens system is greater than 1.0 but less than 1.3.

5. The projection lens system according to claim 1, wherein an absolute value of a ratio of said strong negative optical power of said third lens with respect to an optical power of the entire projection lens system is greater than 0.9 and less than 1.4.

6. The projection lens system according to claim 1, wherein an absolute value of a difference between refractive indexes of said second lens and said third lens is greater than 0.13.

7. The projection lens system according to claim 1, wherein an absolute value of a difference between dispersive values of said second lens and said third lens is greater than 25.0.

8. The projection lens system according to claim 1, wherein a dispersive value of said fourth lens is greater than 50.0.

9. The projection lens system according to claim 1, wherein a distance between said fourth lens and said fifth lens and a distance between said first lens and said second lens are correlatively varied.

* * * * *